US012722912B2

(12) United States Patent
Aoyama et al.

(10) Patent No.: US 12,722,912 B2
(45) Date of Patent: Sep. 1, 2026

(54) TRANSPORT DEVICE, SPECIMEN ANALYSIS SYSTEM COMPRISING TRANSPORT DEVICE, AND SPECIMEN PRE-TREATMENT DEVICE COMPRISING TRANSPORT DEVICE

(71) Applicant: Hitachi High-Tech Corporation, Tokyo (JP)

(72) Inventors: Yasuaki Aoyama, Tokyo (JP); Ryosuke Hoshi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 160 days.

(21) Appl. No.: 18/294,317

(22) PCT Filed: Aug. 1, 2022

(86) PCT No.: PCT/JP2022/029470
§ 371 (c)(1),
(2) Date: Feb. 1, 2024

(87) PCT Pub. No.: WO2023/026777
PCT Pub. Date: Mar. 2, 2023

(65) Prior Publication Data
US 2025/0074721 A1 Mar. 6, 2025

(30) Foreign Application Priority Data
Aug. 26, 2021 (JP) ................................ 2021-138374

(51) Int. Cl.
*B65G 54/02* (2006.01)
*G01N 35/04* (2006.01)

(52) U.S. Cl.
CPC ............ *B65G 54/02* (2013.01); *G01N 35/04* (2013.01); *G01N 2035/0477* (2013.01)

(58) Field of Classification Search
None
See application file for complete search history.

(56) References Cited

U.S. PATENT DOCUMENTS 6,045,319 A * 4/2000 Uchida ................ H02K 41/031 414/676
9,618,525 B2 * 4/2017 Malinowski ........... G01N 35/04
(Continued)

FOREIGN PATENT DOCUMENTS

CN 112840214 A 5/2021
EP 3 984 926 A1 4/2022
(Continued)

OTHER PUBLICATIONS

WO 2020137182A1, 2020, Machine Translation, retrieved from FIT database Nov. 10, 2025 (Year: 2020).*
(Continued)

*Primary Examiner* — William R Harp
(74) *Attorney, Agent, or Firm* — Crowell & Moring LLP

(57) ABSTRACT

The present invention inhibits an inductance of each winding of a conveyance device from varying with position. The conveyance device for conveying a conveyance target object having a magnetic material includes a plurality of teeth 20*a*, 20*b*, and 20*c* formed by a magnetic material, a plurality of windings 30 wound around each of the teeth 20*a*, 20*b*, and 20*c*, a yoke 40 in a shape of a lattice formed by a magnetic material that is magnetically connected to the teeth 20*a*, 20*b*, and 20*c* in order to support the teeth 20*a*, 20*b*, and 20*c*, and an additional yoke 45 formed by a magnetic material that is magnetically connected to an outer end of the yoke 40.

14 Claims, 10 Drawing Sheets

(56) References Cited

U.S. PATENT DOCUMENTS

| | | | | |
|---|---|---|---|---|
| 11,887,780 | B2 * | 1/2024 | Aoyama | H01F 7/064 |
| 2016/0097786 | A1 | 4/2016 | Malinowski et al. | |
| 2021/0398723 | A1 | 12/2021 | Aoyama et al. | |

FOREIGN PATENT DOCUMENTS

| | | | | |
|---|---|---|---|---|
| EP | 4 053 053 | A1 | 9/2022 | |
| EP | 4 108 609 | A1 | 12/2022 | |
| JP | 11-69764 | A | 3/1999 | |
| JP | 2001-8431 | A | 1/2001 | |
| JP | 2001-217183 | A | 8/2001 | |
| JP | 2006-304438 | A | 11/2006 | |
| JP | 2016-75684 | A | 5/2016 | |
| JP | 2020-106354 | A | 7/2020 | |
| JP | 2021-67643 | A | 4/2021 | |
| WO | WO-2020137182 | A1 * | 7/2020 | H02K 41/031 |
| WO | WO 2020/250555 | A1 | 12/2020 | |

OTHER PUBLICATIONS

International Search Report (PCT/ISA/210) issued in PCT Application No. PCT/JP2022/029470 dated Oct. 4, 2022 with English translation (6 pages).

Japanese-language Written Opinion (PCT/ISA/237) issued in PCT Application No. PCT/JP2022/029470 dated Oct. 4, 2022 with English translation (7 pages).

Extended European Search Report issued in European Application No. 22861068.9 dated Jul. 8, 2025 (8 pages).

Chinese-language Office Action issued in Chinese Application No. 202280050467.X dated Apr. 17, 2026, (8 pages).

* cited by examiner

TRANSPORT DEVICE, SPECIMEN ANALYSIS SYSTEM COMPRISING TRANSPORT DEVICE, AND SPECIMEN PRE-TREATMENT DEVICE COMPRISING TRANSPORT DEVICE

TECHNICAL FIELD

The present invention relates to a conveyance device suitable for a specimen analysis system used to analyze blood, urine, and other biological samples (hereinafter referred to as a specimen) and for a specimen pretreatment device used to perform pretreatment necessary for analysis, relates to a specimen analysis system with the conveyance device, and relates to a specimen pretreatment device with a conveyance device.

BACKGROUND ART

Patent Document 1 describes a conveyance device that includes a conveyance target object having a permanent magnet, a magnetic pole having a core and a winding wound around an outer circumference of the core, a drive circuit applying a voltage to the winding, a current detection section detecting a value of a current flowing through the winding, and a calculation section calculating a position of the permanent magnet on the basis of a current value detected by the current detection section.

PRIOR ART DOCUMENT

Patent Document

Patent Document 1: JP-2020-106354-A

SUMMARY OF THE INVENTION

Problem to be Solved by the Invention

A specimen analysis system for clinical examination performs tests of specified analysis items on specimens such as blood, plasma, serum, urine, and other body fluids. The specimen analysis system is able to connect devices having multiple functions and automatically performs individual processes. More specifically, in order to streamline laboratory operations, the specimen analysis system uses conveyance lines to connect analysis sections for multiple analytical fields such as biochemistry and immunology and a pretreatment section performing pretreatment necessary for analysis, and operates the connected sections as a single system.

The conveyance lines used in a conventional specimen analysis system mainly adopt a belt-drive method. The belt-drive method has a problem in that, if conveyance is halted due to a certain abnormality, the specimens cannot be supplied to downstream devices. Therefore, it has been necessary to pay sufficient attention to belt wear.

With the advancement of medical care and development of the aging of society, the importance of specimen treatment is increasing. Therefore, in order to improve an analysis processing capability of the specimen analysis systems, it is desired that the specimens be conveyed at high speed, in large quantities simultaneously, and in multiple directions. As an example of a technology for realizing such conveyance, there is a technology for conveying a conveyance target object by use of a magnetic force (refer to Patent Document 1).

The system in Patent Document 1 described above estimates a position of the permanent magnet by detecting an inductance of a winding that varies with the position of the permanent magnet. Further, on the basis of the estimated position, the system controls the voltage applied to each winding so as to generate a thrust force in the permanent magnet. However, when this method is used for a conveyance device having a plurality of windings arranged vertically and horizontally, the inductance of each winding varies depending on whether the winding is at the center, at the vertical ends, or at the horizontal ends. Therefore, the accuracy of estimating the position of the permanent magnet varies with the location. Further, it has been necessary to set characteristics for estimating the position of the permanent magnet for each location. Furthermore, since the inductance of the windings varies with the location, the current-thrust force characteristics (an amount of current required to obtain a constant thrust force) vary from one location to another. This problematically results in thrust force variations and complicated thrust force control, for example.

Means for Solving the Problem

The present invention includes a plurality of means for solving the above-mentioned problems. One example thereof is a conveyance device conveying a conveyance target object having a magnetic material. The conveyance device includes a plurality of teeth formed by a magnetic material, a plurality of windings wound around each of the plurality of teeth, a yoke in a shape of a lattice formed by a magnetic material magnetically connected to the plurality of teeth in order to support the plurality of teeth, and an additional yoke formed by a magnetic material magnetically connected to an outer end of the yoke.

Advantage of the Invention

According to the present invention, when the conveyance device includes the additional yoke formed by a magnetic material magnetically connected to the outer end of the yoke, it is possible to suppress a phenomenon in which the inductance of the windings varies with the location. This makes it possible to reduce a degree to which a magnitude of the thrust force depends on the location of the conveyance target object at a time of conveyance and stop of the conveyance target object. Further, it is possible to provide the conveyance device in which a detected value and a change value of current necessary for detecting the location of the conveyance target object are stable. That is, it is possible to realize the conveyance device that has high controllability of the conveyance target object and estimates the location of the conveyance target object with high accuracy. Problems, configurations, and advantages other than those described above will be apparent from the following description of embodiments.

BRIEF DESCRIPTION OF THE DRAWINGS

FIG. 1 is a diagram illustrating a configuration of a conveyance device according to a first embodiment.

MODES FOR CARRYING OUT THE INVENTION

Embodiments of a conveyance device provided by the present invention, a specimen analysis system with the conveyance device, and a specimen pretreatment device with the conveyance device are described below with reference to the accompanying drawings.

First Embodiment

Figure 1:
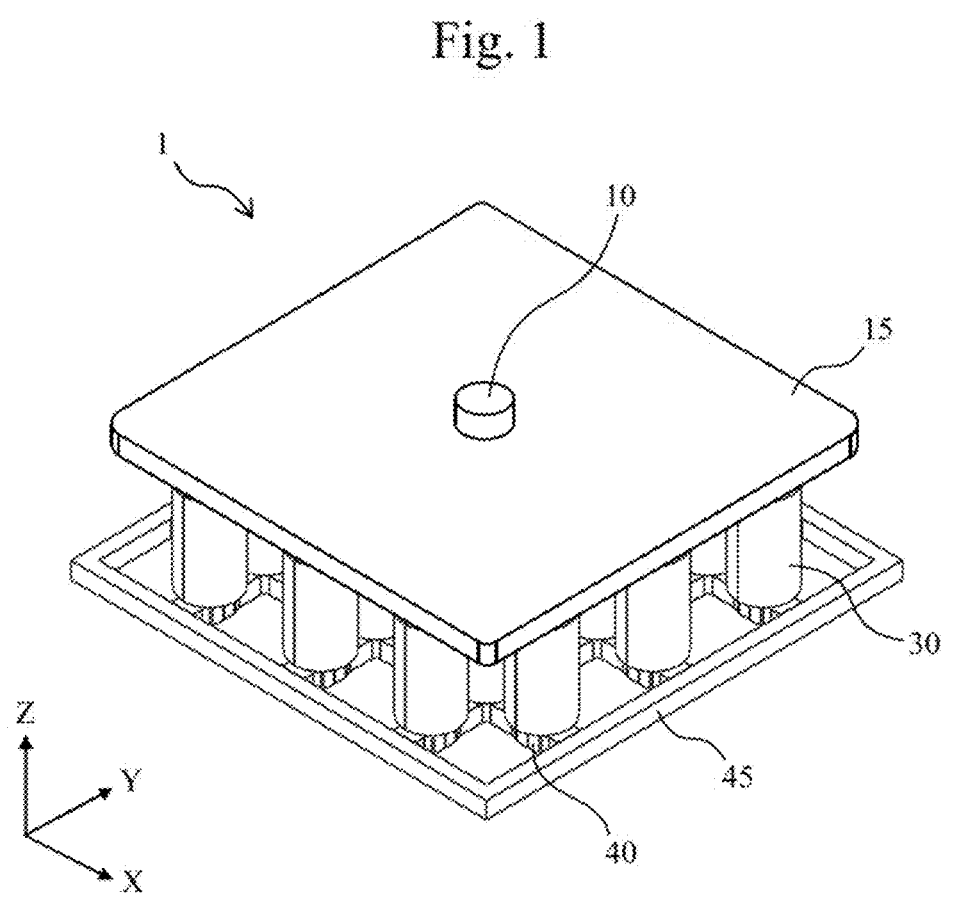
Figure 2A:
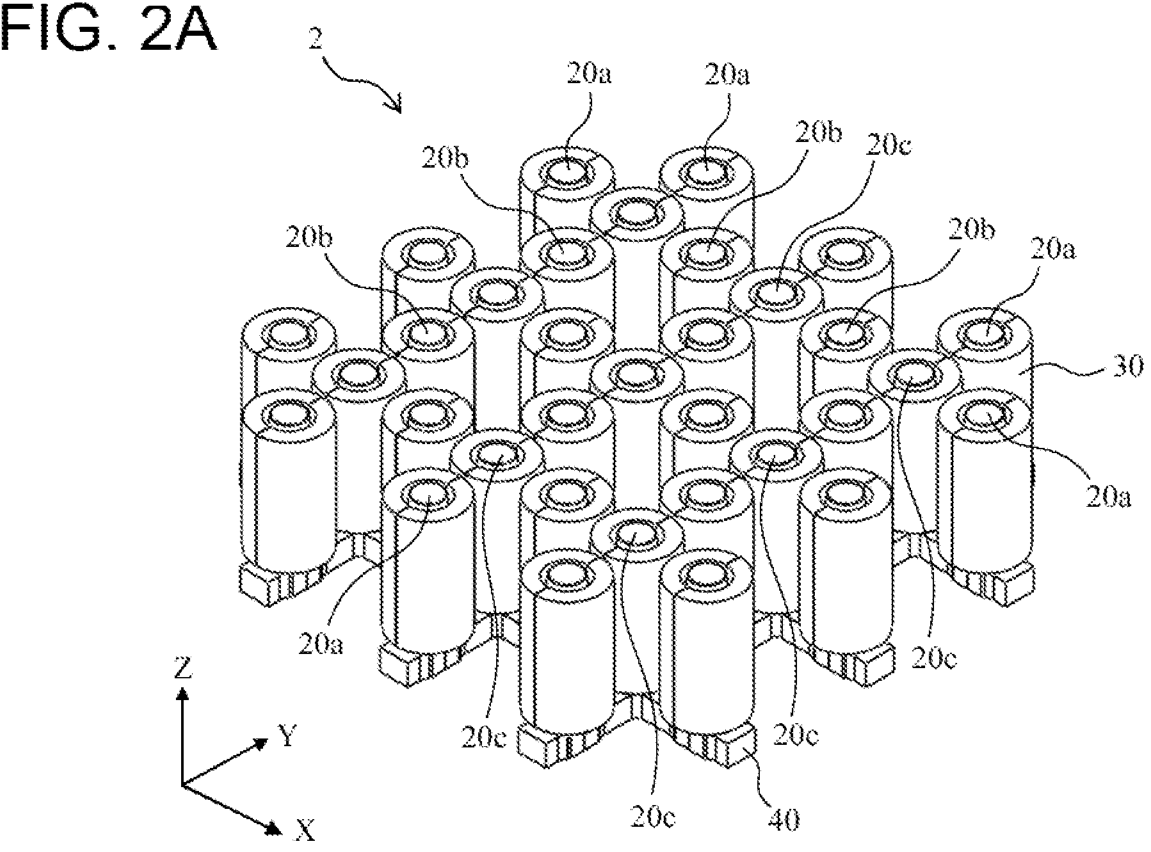
FIGS. 2A and 2B are a set of perspective views illustrating a magnetic circuit section of the conveyance device according to the first embodiment.
Figure 2B:
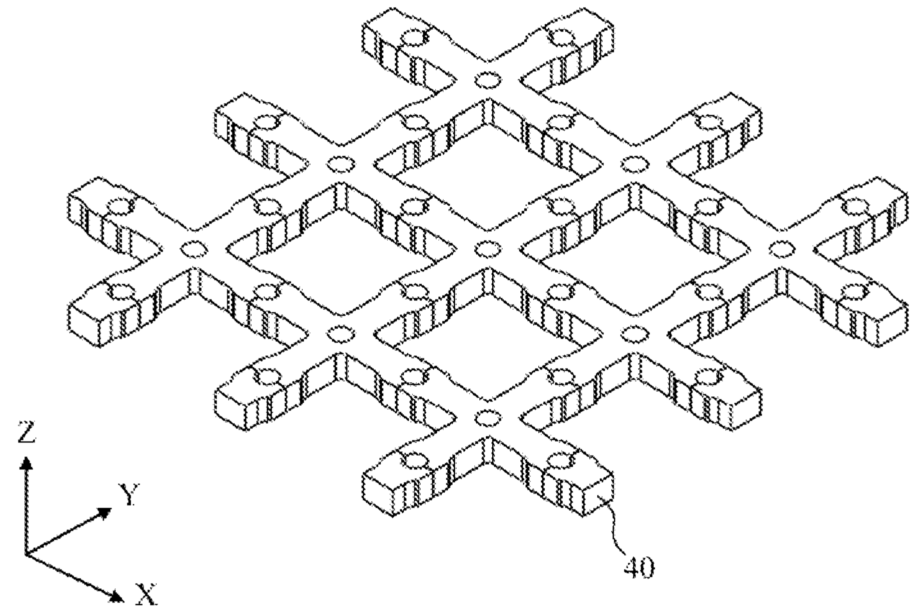

A conveyance device according to a first embodiment will now be described. FIG. 1 is a diagram illustrating a configuration of the conveyance device according to the first embodiment. A conveyance device 1 conveys a conveyance target object 10 in an X-direction and a Y-direction. FIG. 2 is a set of perspective views illustrating a magnetic circuit section of the conveyance device according to the first embodiment. In a case where the conveyance target object 10 is to be conveyed a long distance, a plurality of conveyance devices 1 depicted in FIG. 1 are connected in the X-direction and/or the Y-direction to achieve long-distance conveyance of the conveyance target object 10. A conveyance surface 15 is provided on a magnetic circuit section 2, so that a permanent magnet 11 (see FIG. 8) formed by a magnetic material embedded in the conveyance target object 10 moves over the conveyance surface 15. The magnetic circuit section 2 depicted in part (a) of FIG. 2 has three conveyance lines conveying the conveyance target object 10 in the X-direction and three conveyance lines conveying the conveyance target object 10 in the Y-direction. A winding 30 is wound around each of the plurality of cylindrical teeth 20 formed by a magnetic material. It should be noted that the teeth 20 are general terms for teeth 20*a* to 20*c*. The plurality of teeth 20 are magnetically coupled by a yoke 40 formed by a magnetic material on a side (−Z side) opposite the conveyance surface 15.

Part (b) of FIG. 2 is a diagram illustrating the yoke 40 that is extracted from the magnetic circuit section 2. The yoke 40 is shaped like a lattice and formed in correspondence with the three conveyance lines formed along the X-direction and with the three conveyance lines formed along the Y-direction. The yoke 40 is formed by a magnetic material and magnetically coupled to the plurality of teeth 20. The yoke 40 supports the plurality of teeth 20 such that the plurality of teeth 20 extend in the Z-direction.

The teeth 20 include the teeth 20*a* which are each adjacent to one tooth, the teeth 20*b* which are each adjacent to two teeth, and the teeth 20*c* which are each adjacent to four teeth. The teeth 20*a* are disposed on the outermost side. The teeth 20*a* are adjacent to a tooth on only one side in the X-direction or the Y-direction. The teeth 20*b* are adjacent to teeth on both sides in the X-direction or the Y-direction. The teeth 20*c* are adjacent to teeth on both sides in the −X direction and on both sides in the Y-direction.

The above-described teeth 20*a*, 20*b*, and 20*c* have different characteristics in terms of magnetic circuits. The inductance characteristics of the teeth vary with the number of adjacent teeth. The teeth 20*a* on the outer side have fewer adjacent teeth than the teeth 20*b* and 20*c* on the inner side. Therefore, the amount of magnetic flux generated when a constant current is passed through the winding 30 is smaller in the case of the teeth 20*a* on the outer side than those in the case of the teeth 20*b* and 20*c* on the inner side. Consequently, the thrust force acting on the conveyance target object 10 is relatively small in the case of the teeth 20*a*. Further, since the current value obtained upon application of a constant voltage varies between the winding 30 of the teeth 20*a* on the outer side and the windings 30 of the teeth 20*b* and 20*c* on the inner side, the degree of magnetic saturation also varies. This additionally causes a problem in which the accuracy of detection of the location of the conveyance target object based on magnetic saturation decreases.

Figure 3A:
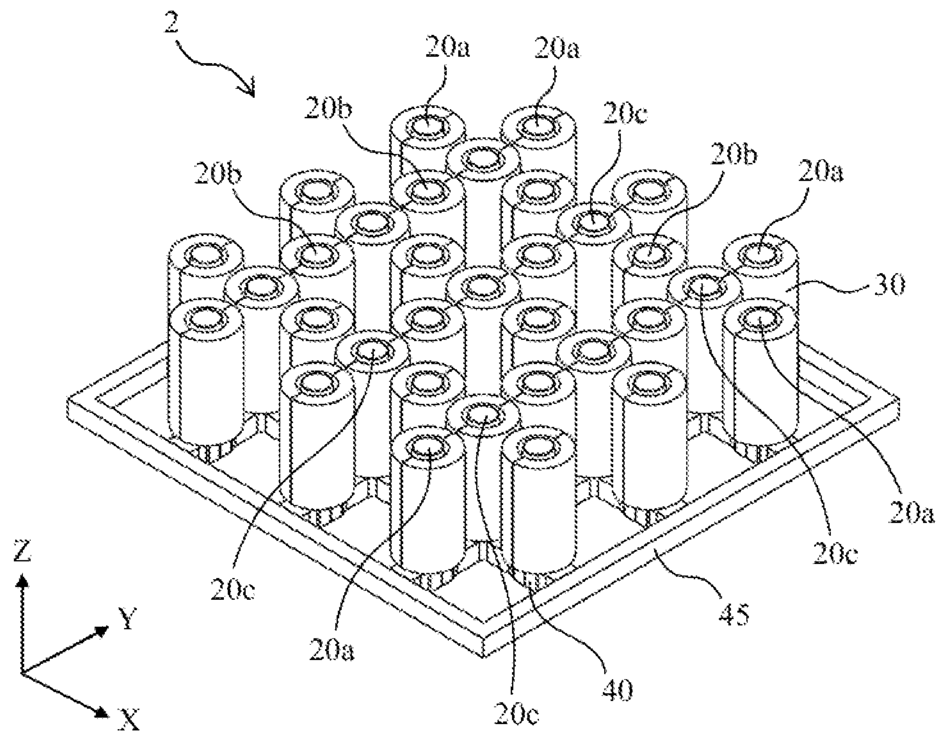
FIGS. 3A and 3B are a set of perspective views illustrating the magnetic circuit section and an additional yoke of the conveyance device according to the first embodiment.
Figure 3B:
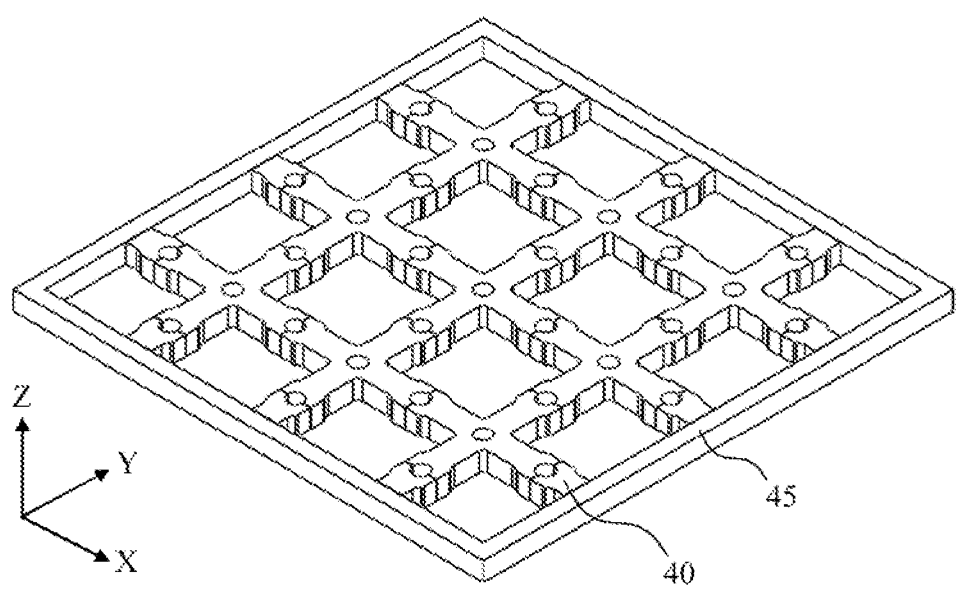

Part (a) of FIG. 3 is a perspective view illustrating the magnetic circuit section of the conveyance device according to the first embodiment. Part (b) of FIG. 3 is a perspective view illustrating an additional yoke of the conveyance device according to the first embodiment. The teeth 20*a* on the outer side of the magnetic circuit section 2 have a small number of adjacent teeth, so that magnetic properties deteriorate. Therefore, the magnetic properties of the teeth 20*a* on the outer side can be improved by installing the additional yoke 45 formed by a magnetic material on the outer periphery of the yoke 40. In the first embodiment, the additional yoke 45 is connected to the outer periphery of the yoke 40. However, the additional yoke 45 need not necessarily be connected to the outer periphery of the yoke 40 and may be connected to an outer end of the yoke 40. In part (a) of FIG. 3, one additional yoke 45 is connected to one magnetic circuit section 2. Alternatively, however, one additional yoke 45 may be connected to a plurality of magnetic circuit sections 2. For example, even in a case where the plurality of magnetic circuit sections 2 are disposed in the X-direction and/or the Y-direction, the teeth on the outer side whose magnetic performance deteriorates are present on the outer side of the disposed plurality of magnetic circuit sections 2. In this case, the magnetic properties of the disposed plurality of magnetic circuit sections 2 can easily be adjusted by installing the additional yoke 45 or changing the size of the additional yoke 45 after the plurality of magnetic circuit sections 2 are installed. Since operations performed outside the magnetic circuit section 2 are easier than operations performed inside the magnetic circuit section 2, it is easy to adjust the magnetic properties with the additional yoke 45. Further, the magnetic properties of the magnetic circuit section 2 can be changed by replacing the additional yoke 45 with an additional yoke of different dimensions. As a result, in a case where the mass or the subject of the conveyance target object 10 is changed, the magnetic properties of the magnetic circuit section 2 can easily be changed according to the conveyance target object 10.

Second Embodiment

Figure 4A:
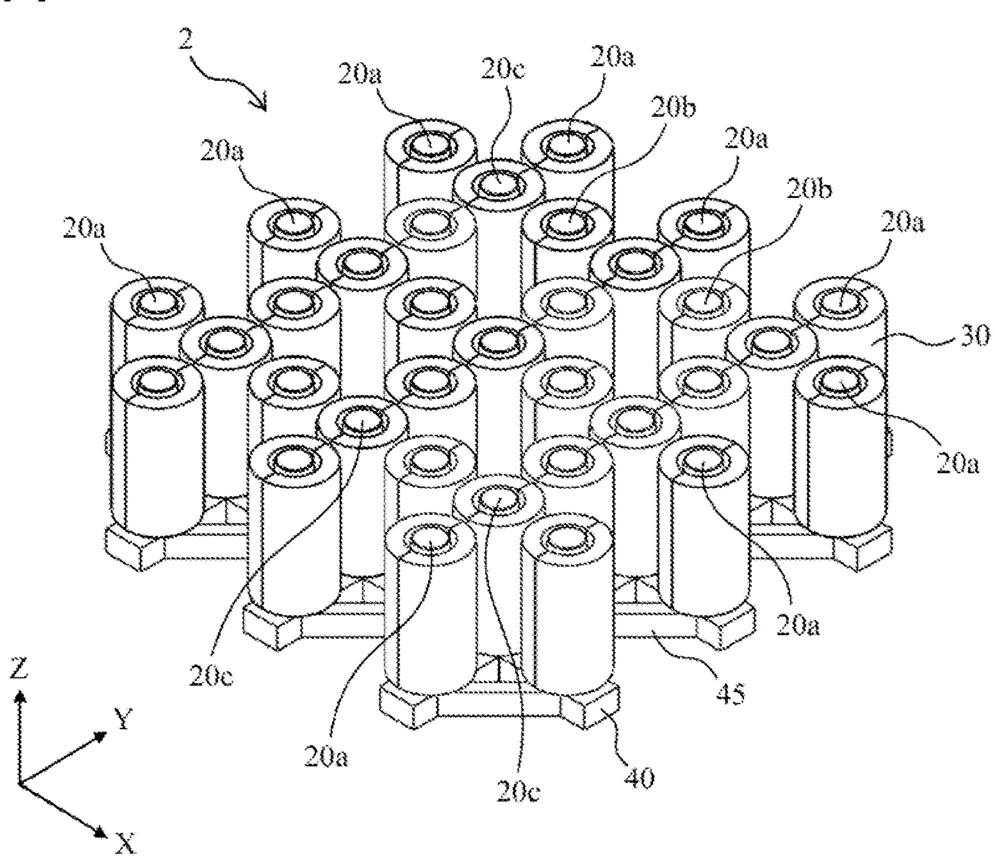
FIGS. 4A and 4B are a set of perspective views illustrating a magnetic circuit section and an additional yoke of a conveyance device according to a second embodiment.
Figure 4B:
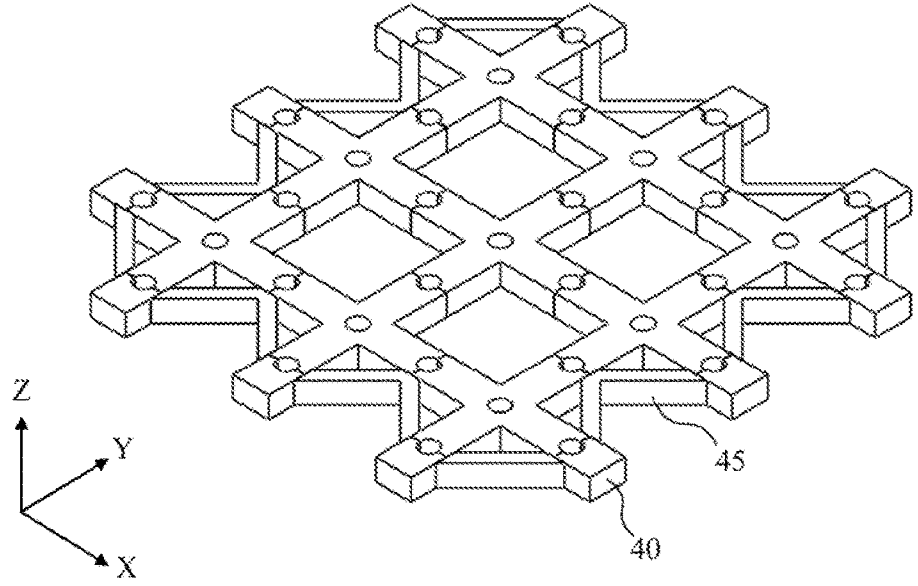

The conveyance device according to a second embodiment will now be described with reference to FIG. 4. Component elements similar to those in the first embodiment will not be redundantly described. Part (a) of FIG. 4 is a perspective view illustrating the magnetic circuit section of the conveyance device according to the second embodiment. Part (b) of FIG. 4 is a perspective view illustrating the additional yoke of the conveyance device according to the second embodiment. The teeth 20*a* on the outer side of the magnetic circuit section 2 have one adjacent tooth only in the X- or Y-direction. Therefore, in order to improve the magnetic properties of the teeth 20*a* on the outer side, the magnetic circuit section 2 in the second embodiment has the additional yoke 45 that magnetically connects the teeth 20*a* on the outer side to a tooth being present in the XY-direction (diagonal direction) of the teeth 20*a* on the outside. Since the above-described configuration is adopted, the teeth 20*a* on the outer side are adjacent to three teeth. This improves the magnetic properties of the teeth 20*a* on the outer side.

Further, the ends of the magnetic circuit section 2 are likely to bend due to their own weight. The bend of the magnetic circuit section 2 can also be suppressed by providing the additional yoke 45 along the XY-direction (diagonal direction).

Third Embodiment

Figure 5A:
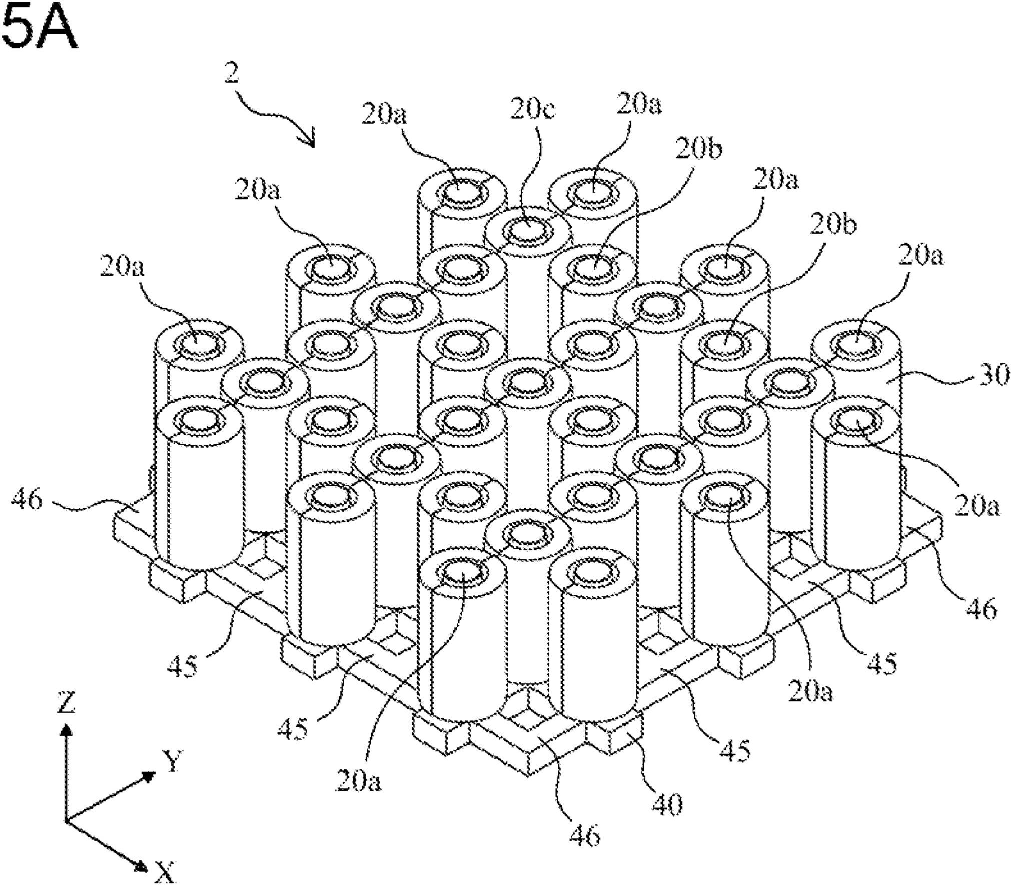
FIGS. 5A and 5B are a set of perspective views illustrating a magnetic circuit section and an additional yoke of a conveyance device according to a third embodiment.
Figure 5B:
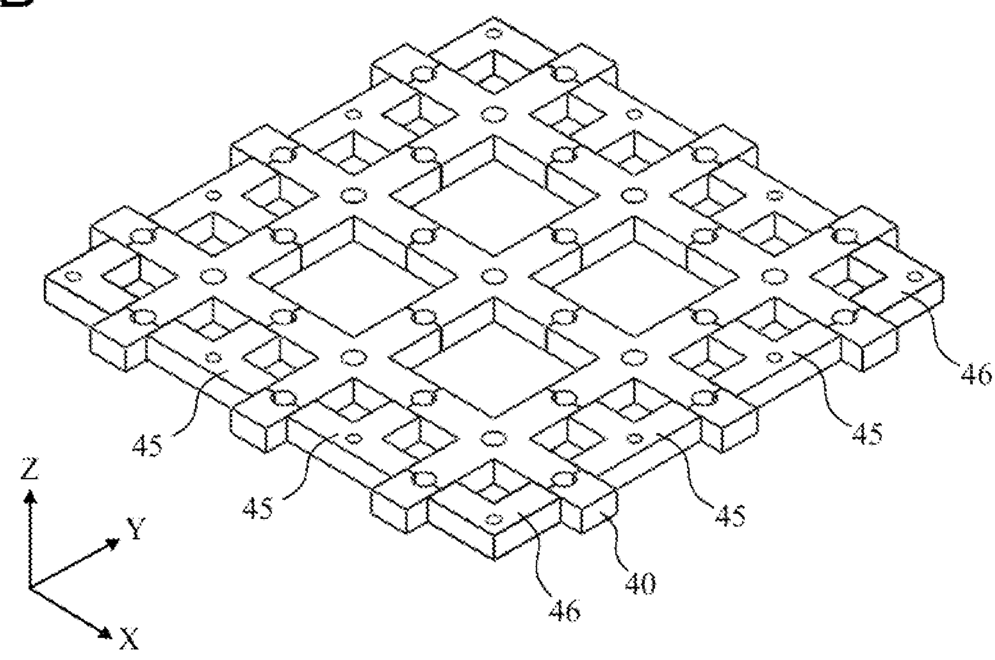

The conveyance device according to a third embodiment will now be described with reference to FIG. 5. The component elements similar to those in the first embodiment will not be redundantly described. Part (a) of FIG. 5 is a perspective view illustrating the magnetic circuit section of the conveyance device according to the third embodiment. Part (b) of FIG. 5 is a perspective view illustrating the additional yoke of the conveyance device according to the third embodiment. The teeth 20*a* on the outer side of the magnetic circuit section 2 have one adjacent tooth only in the X- or Y-direction. Therefore, in order to improve the magnetic properties of the teeth 20*a* on the outer side, the magnetic circuit section 2 in the third embodiment has the additional yoke 45 that is shaped like the letter T and configured to magnetically connect the teeth 20*a* on the outer side to a tooth being present in the XY-direction (diagonal direction) of the teeth 20*a* on the outside. Since the above-described configuration is adopted, the teeth 20*a* on the outer side are adjacent to three teeth. This improves the magnetic properties of the teeth 20*a* on the outer side.

Further, since the additional yoke 45 is shaped like the letter T, the T-shaped additional yoke 45 can be subsequently fitted into a U-shaped region existing on the outer side of the yoke 40. For example, after the conveyance device 1 is installed, the T-shaped additional yoke 45 configured with tight-fit accuracy can be inserted by hitting it, for instance, with a hammer from the outer circumferential side. Therefore, after the conveyance device 1 is installed, the magnetic properties can easily be adjusted. Moreover, an additional yoke 46 shaped like the letter L is coupled to a corner of the magnetic circuit section 2. This additional yoke 46 may be molded integrally with the yoke 40 at the beginning.

Fourth Embodiment

Figures 6A, 6B:
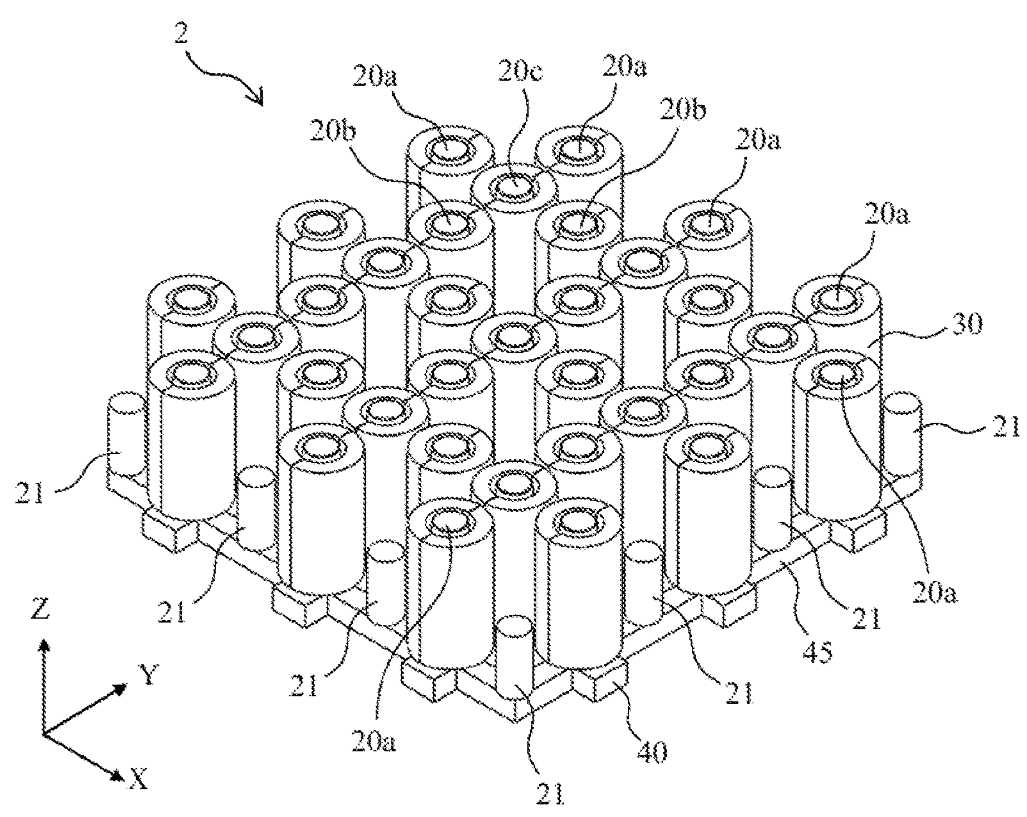
FIGS. 6A and 6B are a set of perspective views illustrating a magnetic circuit section and an additional yoke of a conveyance device according to a fourth embodiment.

The conveyance device according to a fourth embodiment will now be described with reference to FIG. 6. The component elements similar to those in the third embodiment will not be redundantly described. Part (a) of FIG. 6 is a perspective view illustrating the magnetic circuit section of the conveyance device according to the fourth embodiment. Part (b) of FIG. 6 is a perspective view illustrating the additional yoke of the conveyance device according to the fourth embodiment. The teeth 20*a* on the outer side of the magnetic circuit section 2 have one adjacent tooth only in the X- or Y-direction. Therefore, in order to improve the magnetic properties of the teeth 20*a* on the outer side, the magnetic circuit section 2 in the fourth embodiment has the additional yoke 45 that is shaped like the letter T and configured to magnetically connect the teeth 20*a* on the outer side to a tooth being present in the XY-direction (diagonal direction) of the teeth 20*a* on the outside. Since the above-described configuration is adopted, the teeth 20*a* on the outer side are adjacent to three teeth. This improves the magnetic properties of the teeth 20*a* on the outer side.

Further, the additional yoke 46 shaped like the letter L is coupled to a corner of the magnetic circuit section 2. Furthermore, an additional yoke 47 shaped like a cross is coupled to the center of the magnetic circuit section 2.

The conveyance device according to the fourth embodiment includes auxiliary teeth 21 formed by a magnetic material that has no winding. A plurality of auxiliary teeth 21 are disposed along the four sides of the conveyance device which is substantially quadrilateral. The auxiliary teeth 21 are magnetically connected to additional yokes 45 and 46. The auxiliary teeth 21 are disposed between the teeth 20*a* on the outer side. The auxiliary teeth 21 each have a shorter length in the Z-direction than the teeth 20 wound with the winding 30. The number of teeth adjacent to the teeth 20*a* on the outer side is increased by providing the auxiliary teeth 21 between the teeth 20*a* on the outer side. Further, since the auxiliary teeth 21 are disposed between the teeth 20*a* on the outer side, it is possible to install a return path for the magnetic flux on the side (Z-direction) toward the conveyance surface (see FIG. 1) of a tooth. This can further improve the magnetic properties.

Figure 7A:
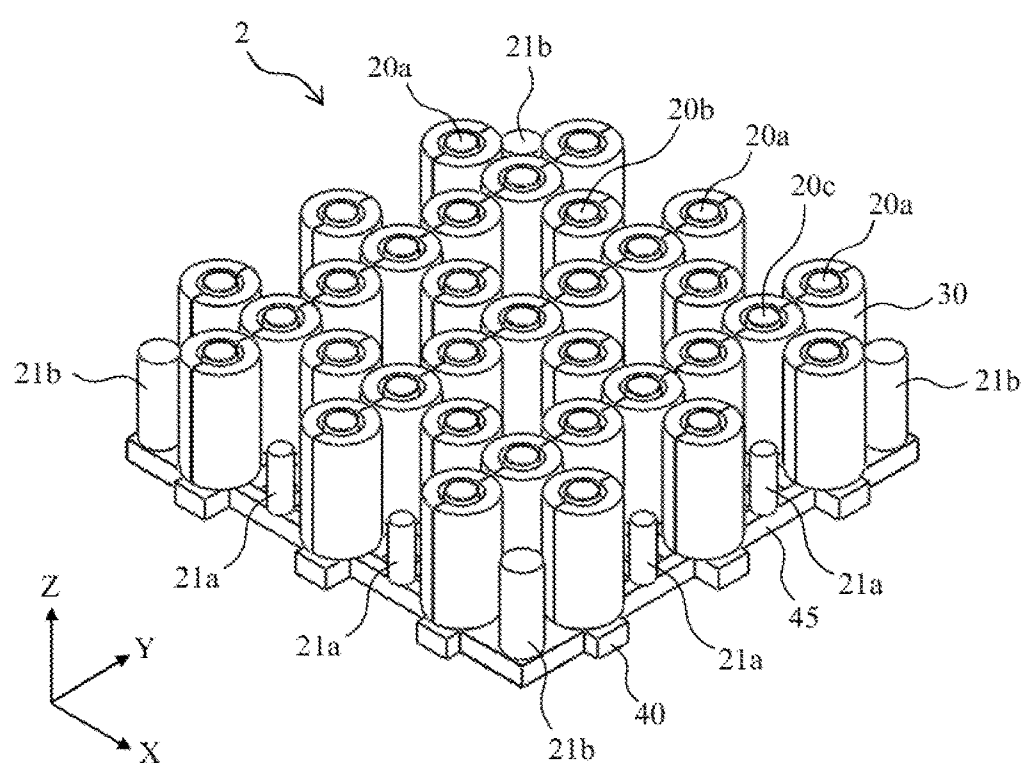
FIGS. 7A to 7B are a set of perspective views illustrating the magnetic circuit section and the additional yoke of the conveyance device according to a modification of the fourth embodiment.
Figure 7B:
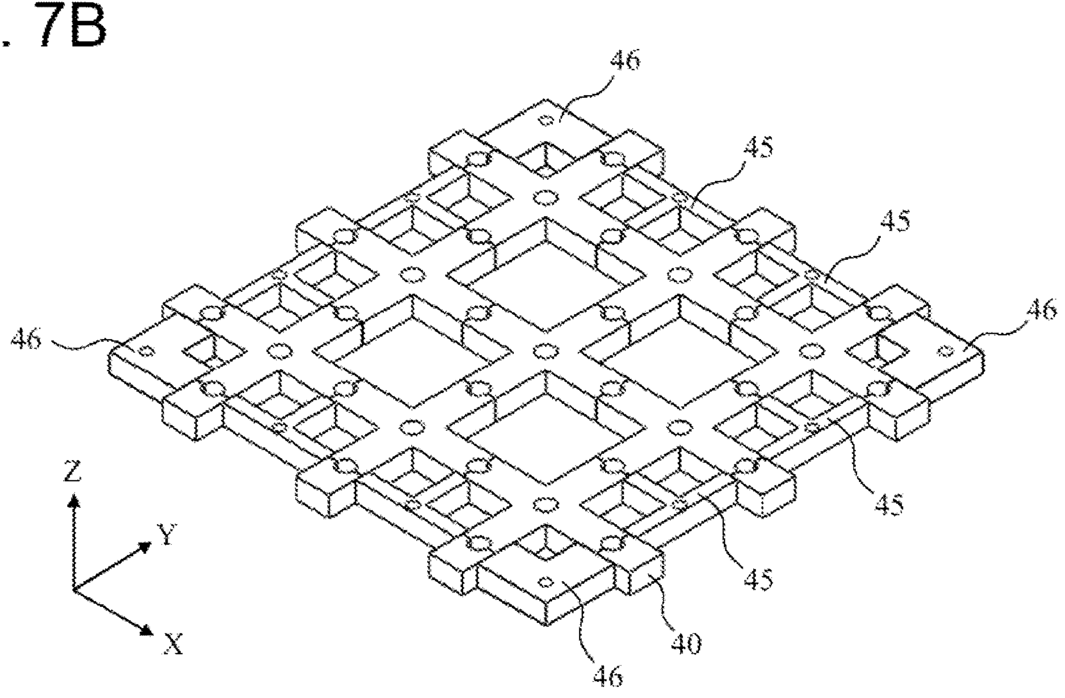

FIG. 7 illustrates a modification of the fourth embodiment. The conveyance device according to the modification illustrated in FIG. 7 includes auxiliary teeth 21*a* and 21*b* that are formed by a magnetic material with no winding. The auxiliary teeth 21*a* are magnetically connected to the additional yoke 45 shaped like the letter T, and the auxiliary teeth 21*b* are magnetically connected to the additional yoke 46 shaped like the letter L. The auxiliary teeth 21*a* are disposed between the teeth 20*a* on the outer side. The auxiliary teeth 21*b* are disposed on a corner of the magnetic circuit section 2. A plurality of the auxiliary teeth 21*a* and 21*b* are disposed along the four sides of a substantially quadrilateral and become thicker and/or longer from the center of one side toward the corner. That is, the diameter of the auxiliary teeth 21*b* installed on the corners of the magnetic circuit section 2 is larger than that of the auxiliary teeth 21*a*. Further, the length of the auxiliary teeth 21*b* in the Z-direction is greater than that of the auxiliary teeth 21*a*.

The magnetic circuit section 2 in the modification of the fourth embodiment includes three conveyance lines conveying the conveyance target object 10 in the X-direction and three conveyance lines conveying the conveyance target object 10 in the Y-direction. Among the three conveyance lines for conveying the conveyance target object 10 in the X-direction, the teeth forming an inner conveyance line and the teeth forming an outer conveyance line have different magnetic properties. Further, among the three conveyance lines conveying the conveyance target object 10 in the Y-direction, the teeth forming an inner conveyance line and the teeth forming an outer conveyance line have different magnetic properties. Therefore, in order to improve the magnetic properties of the inner and outer conveyance lines, the auxiliary teeth 21*a* and 21*b* are made different from each other in at least one of the length and the diameter. Moreover, the additional yokes 45 and 46 can be made different from each other in at least one of the cross-sectional dimensions and the volume.

Regarding an inductance of the teeth 20*a* on the outer side, the inductance of the teeth 20*a* on the outer side decreases from the inside to the outside in the X- or Y-direction. Therefore, the magnetic properties can be improved by increasing at least one of the length and the diameter of the auxiliary teeth 21*a* and 21*b* from the inside to the outside in the X- or Y-direction. Further, the magnetic properties can be improved by increasing at least one of the cross-sectional dimensions and volume of the additional yokes 45 and 46 from the inside to the outside in the X- or Y-direction. The magnetic properties of the magnetic circuit section 2 can be adjusted by using the auxiliary teeth 21*a* and 21*b* that are different from each other in at least one of the diameter and the length. Furthermore, the magnetic properties of the magnetic circuit section 2 can be adjusted by use of the additional yokes 45 and 46 that are different from each other in at least one of the cross-sectional dimensions and the volume. Moreover, workability in adjusting the magnetic properties is improved by adopting a configuration in which the auxiliary teeth 21 are screwed into or inserted like a pin into the additional yokes 45.

Fifth Embodiment

Figure 8:
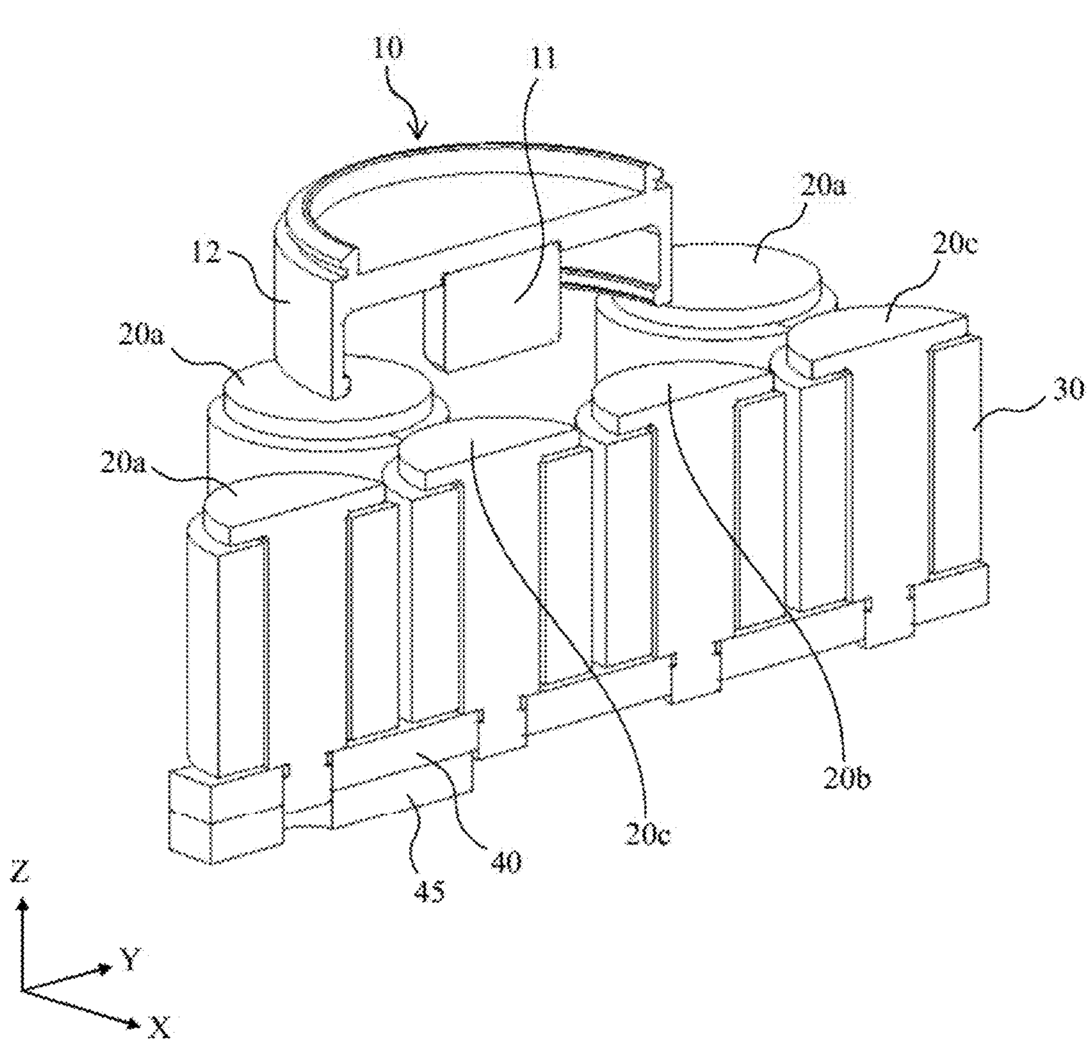
FIG. 8 is a perspective view illustrating a cross-section of a magnetic circuit section of a conveyance device according to a fifth embodiment.

The conveyance device 1 according to a fifth embodiment will now be described with reference to FIG. 8. The component elements similar to those in the first embodiment will not be redundantly described. FIG. 8 is a perspective view illustrating a cross-section of the magnetic circuit section of the conveyance device according to the fifth embodiment. In FIG. 8, the magnetic circuit section 2 is partly cut away such that the teeth 20*a* on the outer side and the cross-sections of the teeth 20*b* and 20*c* on the inner side are visible. The teeth 20*a* on the outer side of the magnetic circuit section 2 and the teeth 20*b* and 20*c* on the inner side are coupled together through the yoke 40. Further, the conveyance target object 10 includes a permanent magnet 11 and a holder cover 12. The holder cover 12 is formed by a magnetic material that holds the permanent magnet 11 and suppresses leakage of magnetic flux. Furthermore, the additional yoke 45 formed by a magnetic material is provided underneath the outer end of the teeth 20*a* on the outer side. As described above, the magnetic properties of the magnetic circuit section 2 can be improved by installing the additional yoke 45 only underneath the teeth 20*a* on the outer side. In the present embodiment, the thickness of the entire yoke in the Z-direction is increased by installing the additional yoke 45 underneath the teeth 20*a* on the outer side. However, since the same advantages can be obtained by increasing the cross-sectional area of a magnetic path, the thickness or width of the entire yoke may be increased by use of the additional yoke 45. For example, the U-shaped additional yoke 45 may alternatively be fitted into the yoke 40 from below or may be placed over the yoke 40 from above. Moreover, the additional yoke 45 may alternatively be coupled to the yoke 40 by screwing or welding.

Figure 9:
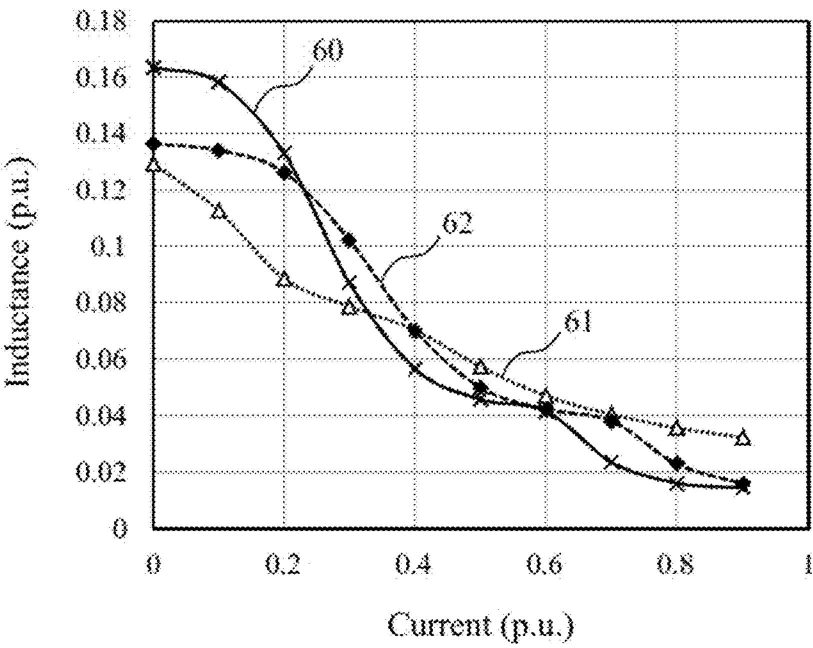
FIG. 9 is a diagram illustrating advantages provided by the magnetic circuit section of the conveyance device according to the fifth embodiment.

FIG. 9 depicts the effect of magnetic property improvement by the present embodiment. In FIG. 9, the horizontal axis represents the value of current (the rated value is expressed as 1.0 p.u.) flowing through the winding of target teeth, and the vertical axis represents inductance characteristics (expressed in p.u. notation) at a time of a minute current change in the value of current. The inductance characteristics 61 of the teeth 20*a* on the outer side are different from the inductance characteristics 60 of the teeth 20*b* or the teeth 20*c* on the inner side due to difference in the number of adjacent teeth. Therefore, the additional yoke 45 is provided in order to increase the degree of magnetic coupling between the teeth 20*a* on the outer side and the teeth 20*b* or the teeth 20*c* on the inner side. In a case where the additional yoke 45 is installed, the inductance characteristics 62 of the teeth 20*a* on the outer side are closer to the inductance characteristics 60 of the teeth 20*b* or the teeth 20*c* on the inner side than the inductance characteristics 61 of the teeth 20*a* on the outer side. The thickness of the additional yoke 45 is equivalent to that of the yoke 40. That is, the thickness of the combination of the yoke 40 and the additional yoke 45 is two times greater than that of a portion where only the yoke 40 is provided. Further, the improvement in the magnetic properties of the magnetic circuit section 2 by the additional yoke 45 can be adjusted by changing, for example, the shape, the width, the thickness, the material, or the processing method of the additional yoke 45.

<Conveyance System>

Figure 10:
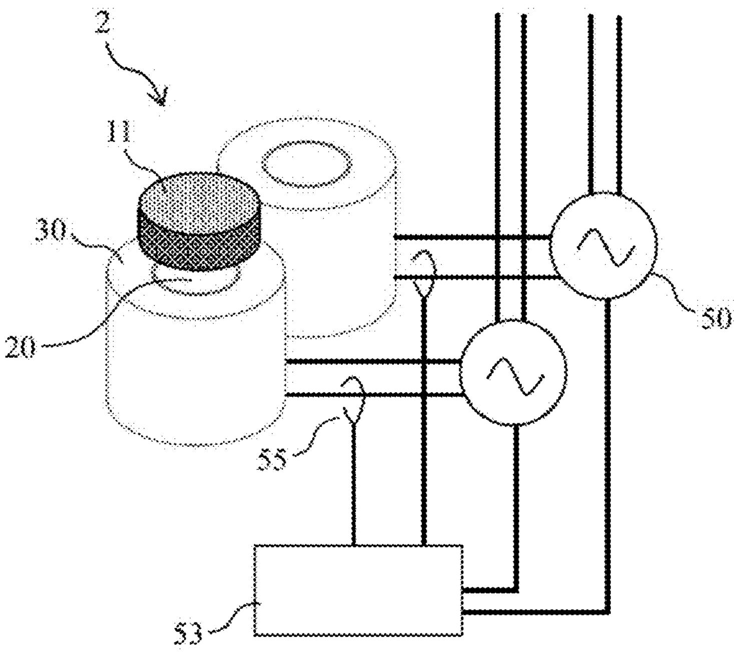
FIG. 10 is a diagram illustrating a configuration of a conveyance system.

FIG. 10 is a diagram illustrating an example of a configuration of a conveyance system for conveying the conveyance target object 10. The permanent magnet 11 of the conveyance target object 10 is conveyed on the conveyance surface 15 installed on the magnetic circuit section 2. The conveyance system depicted in FIG. 10 is a system that estimates the location of the conveyance target object 10 on the conveyance surface from the relation between the voltage applied to the winding and the current flowing through the winding. The conveyance system connects a current detection section 55 to each of the windings 30 and estimates the location of the conveyance target object 10 on the basis of pieces of information from a plurality of current detection sections 55. A drive circuit 50 applies a voltage to a coil to generate the thrust force that is to be applied to the conveyance target object 10. A calculation section 53 controls the drive circuit 50 according to a detected current value.

For example, a neodymium magnet or a ferrite magnet is used as the permanent magnet 11. Alternatively, a magnet other than these magnets or a soft magnetic material may be used instead of the permanent magnet 11. Further, instead of the permanent magnet 11, a combination of the permanent magnet 11 and the soft magnetic material may be used. It should be noted that the term "magnetic material" here denotes the permanent magnet 11, other magnets, a soft magnetic material, or the combination of the permanent magnet 11 and the soft magnetic material. Here, the permanent magnet 11 is used as an example of the magnetic material.

The conveyance system requires relative location information regarding the conveyance target object 10 and the winding 30. This is to ensure that an electromagnetic force generated in the teeth 20 by passing a current through the winding 30 is caused to efficiently act on the conveyance target object 10 and that the conveyance target object 10 is caused to be moved in a desired direction. For example, let us assume a case where the conveyance target object 10 is located above (directly above) one of the two windings 30. Even in a case where a voltage is applied to the winding 30 directly below the conveyance target object 10, no force (thrust force) in a conveyance direction is applied to the conveyance target object 10. Meanwhile, when a voltage is applied to the winding 30 located at a position at which the conveyance target object 10 is not above (directly above) the winding 30 (the winding 30 that is not directly below the conveyance target object 10), a force for drawing the conveyance target object 10 toward the winding 30 is generated to generate a force (thrust force) in the conveyance direction. That is, a force in the conveyance direction can efficiently be applied to the conveyance target object 10 by applying a voltage to a desired winding 30. Further, the orientation (direction) of the force to be applied in the conveyance direction can be controlled by selecting the winding 30 to which the voltage is to be applied.

<Principle of Conveyance Container Location Detection>

Detection of the location of the conveyance target object 10 will now be described. In a case where the conveyance target object 10 is above the winding 30 depicted in the front in FIG. 10, a magnetic field created by the permanent magnet 11 acts on the winding 30. In this instance, the magnetic field acting on the winding 30 near the conveyance target object 10 and the magnetic field acting on the winding 30 far from the conveyance target object 10 differ in magnitude. That is, the magnitude of the magnetic field acting on the winding 30 varies with the relative locations of the conveyance target object 10 and the winding 30.

The teeth 20 are formed by a magnetic material and have such a property that the magnetic flux configured to pass through the teeth 20 does not easily pass through the teeth 20 when the magnetic flux increases. Here, when a voltage is applied to the winding 30 to cause a current to flow, a magnetic flux (magnetic field) generated by the current is generated in the teeth 20. Therefore, a magnetic flux (magnetic field) generated by the permanent magnet 11 and a magnetic flux (magnetic field) generated by the current flowing through the winding 30 are generated in the teeth 20. In general, when a current is passed through the winding 30, a magnetic field is generated around the winding 30, and the resulting magnetic flux is proportional to the value of the current passed. The constant of such proportionality is called inductance. When the magnetic field from the permanent magnet 11 is present, magnetic saturation occurs in the winding 30 to reduce magnetic permeability. This results in a change in the current flowing through the winding 30.

In a case where a voltage is applied to the winding 30, an inductance L can be calculated by detection of the current flowing through the winding 30 and the way the current flows. More specifically, upon detection of the inductance L of the winding 30 which varies with the location of the permanent magnet 11, the location of the permanent magnet 11 affecting the inductance L can be determined. Therefore, the drive circuit 50 is connected to the winding 30, and the current detection section 55 (e.g., a resistor) for detecting the value of the current flowing through the winding 30 is provided. Subsequently, a voltage is applied to the winding 30 by the drive circuit 50, then a current value generated by the applied voltage is detected by the current detection section 55, and the detected current value is read by the calculation section 53.

If the teeth **20*b* and 20*c* on the inner side and the teeth 20*a* on the outer side differ in inductance characteristics, it will affect the estimation of the location of the permanent magnet 11 and the generation of thrust force. More specifically, such difference affects conveyance stability of the conveyance target object 10 and operational requirements necessary for conveyance (e.g., conveyance speed, unevenness of conveyance speed, and acceleration/deceleration characteristics). Therefore, the additional yokes 45 and 46 are provided in the embodiment described above. The installation examples of the additional yokes 45 and 46 are as described in conjunction with the first to fifth embodiments. A slight difference in inductance between the teeth 20*b* and 20*c* on the inner side and the teeth 20*a*** on the outer side causes, for example, a significant location estimation error and a delay in the control of thrust force. Therefore, in the conveyance system, it is important to reduce the differences in inductance characteristics and thrust force characteristics of the individual teeth in order to achieve stable conveyance. Consequently, being able to improve and adjust the magnetic properties for the individual locations of the teeth leads to the implementation of a high-performance conveyance device.

<Specimen Analysis System and Specimen Pretreatment Device>

Figure 11:
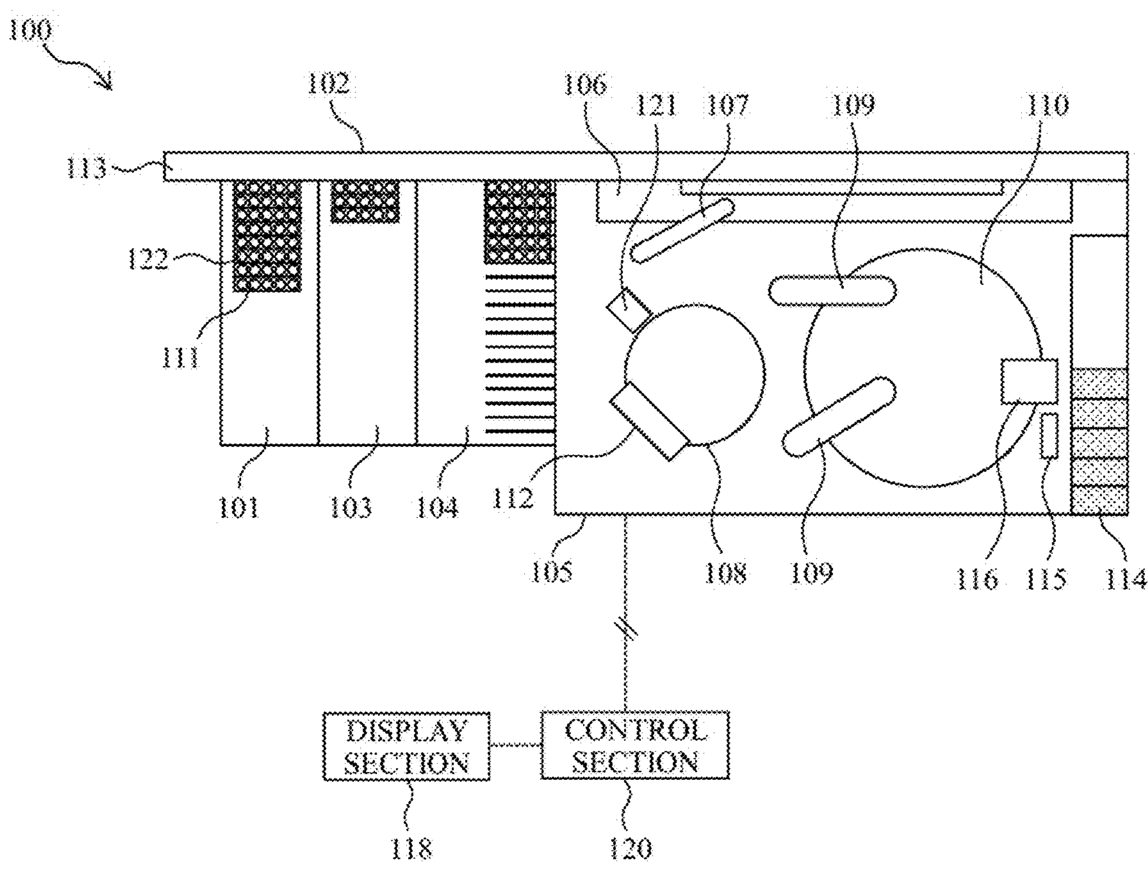
FIG. 11 is a diagram illustrating a configuration of a specimen analysis system.

An overall configuration of a specimen analysis system 100 will now be described with reference to FIG. 11. FIG. 11 is a diagram schematically illustrating the overall configuration of the specimen analysis system 100.

Described with reference to FIG. 11, the specimen analysis system 100 is a device which dispenses a specimen and a reagent into a reaction container, allows them to react with each other, and measures the liquid resulting from the reaction. The specimen analysis system 100 includes a loading section 101, an emergency rack loading port 113, a conveyance line 102, a buffer 104, an analysis section 105, a storage section 103, a display section 118, and a control section 120.

The loading section 101 is a place where a specimen rack 111 is to be installed. The specimen rack 111 stores a plurality of specimen containers 122 that contain biological samples such as blood and urine. The emergency rack loading port 113 is a place for loading, into the device, a specimen rack (calibration rack) loaded with a standard solution and the specimen rack 111 in which the specimen containers 122 containing specimens in need of urgent analysis are stored.

The buffer 104 holds a plurality of specimen racks 111 conveyed by the conveyance line 102, in such a manner that the order of dispensing the specimens in the specimen racks 111 can be changed. The analysis section 105 analyzes the specimens that are conveyed from the buffer 104 through a conveyor line 106. The storage section 103 holds the specimen racks 111 that accommodate the specimen containers 122 containing the specimens that have been analyzed in the analysis section 105. The conveyance line 102 is a line for conveying the specimen racks 111 installed in the loading section 101, and has a configuration equivalent to that of any one of the conveyance devices according to the first to fifth embodiments which have been described above. In the specimen analysis system, the permanent magnet 11 is disposed on the back side of the specimen rack 111. That is, the specimen rack 111 acts as the conveyance target object 10.

The analysis section 105 includes the conveyor line 106, a reaction disk 108, a specimen dispensing nozzle 107, a reagent disk 110, a reagent dispensing nozzle 109, a cleaning mechanism 112, a reagent tray 114, a reagent ID reader 115, a reagent loader 116, and a spectrophotometer 121. The conveyor line 106 is a line that loads the specimen racks 111 which are held in the buffer 104 into the analysis section 105.

The reaction disk 108 includes a plurality of reaction containers. The specimen dispensing nozzle 107 dispenses the specimens from the specimen containers 122 to the reaction containers of the reaction disk 108 by rotational driving or vertical driving. The reagent disk 110 holds a plurality of reagent bottles. The reagent dispensing nozzle 109 dispenses reagents from the reagent bottles of the reagent disk 110 to the reaction containers of the reaction disk 108. The cleaning mechanism 112 cleans the reaction containers of the reaction disk 108. The spectrophotometer 121 measures the absorbance of a reaction solution by measuring transmitted light obtained from a light source (not depicted) through the reaction solution in the reaction container.

The reagent tray 114 is a member on which a reagent is placed when the reagent is to be registered in the specimen analysis system 100. The reagent ID reader 115 is an apparatus for acquiring reagent information by reading a reagent ID assigned to the reagent placed on the reagent tray 114. The reagent loader 116 is an apparatus that loads the reagent into the reagent disk 110.

The display section 118 is a display apparatus for displaying the result of analysis of the concentration of a predetermined component in a liquid specimen such as blood or urine. The control section 120 is formed by a computer including, for example, a CPU, a ROM, a RAM, and a storage and controls the operation of each mechanism in the specimen analysis system 100. The control section 120 performs arithmetic processing to determine the concentration of a predetermined component in a specimen such as blood or urine.

A specimen analysis process performed by the specimen analysis system 100 is described below. First, the specimen rack 111 is installed in the loading section 101 or in the emergency rack loading port 113 and is loaded by the conveyance line 102 into the buffer 104 which can randomly be accessed. The specimen analysis system 100 uses the conveyor line 106 to load, into the analysis section 105, the specimen rack 111 that is stored in the buffer 104 and assigned the highest priority according to priority rules.

Having arrived at the analysis section 105, the specimen rack 111 is transferred by the conveyor line 106 to a specimen separation position near the reaction disk 108. The specimen dispensing nozzle 107 separates the specimen from the specimen containers 122 on the specimen rack 111 and dispenses the specimen into the reaction container of the reaction disk 108. The specimen dispensing nozzle 107 performs separation of the specimen as many times as necessary according to requested analysis items for the specimen. The specimen dispensing nozzle 107 separates the specimen from all the specimen containers 122 mounted on the specimen rack 111. When a separation process is completed for all the specimen containers 122, the specimen rack 111 is transferred to the buffer 104. Further, upon completion of all specimen separation processes including an automatic re-examination, the specimen rack 111 is transferred to the storage section 103 by the conveyor line 106 and the conveyance line 102.

Further, the reagent used for analysis is separated from a reagent bottle on the reagent disk 110 by the reagent dispensing nozzle 109. The separated reagent is then dispensed into the reaction container into which the specimen is previously dispensed. Subsequently, a stirring mechanism (not depicted) stirs a liquid mixture of the specimen and the reagent in the reaction container. Light generated from the light source is transmitted through the reaction container containing the stirred liquid mixture, and the light intensity of the transmitted light is measured by the spectrophotometer 121. The light intensity measured by the spectrophotometer 121 is sent to the control section 120 through an A/D converter and an interface. The control section 120 then performs calculations to determine the concentration of a predetermined component in a liquid specimen such as blood or urine, and displays the result, for example, on the display section 118 or stores the result in the storage section (not depicted).

It should be noted that the specimen analysis system 100 does not need to include all the component elements depicted in FIG. 11. The specimen analysis system 100 can additionally include pretreatment units as needed and omit some units and component elements. Further, the analysis section 105 need not always be used for biochemical analysis only, and may be used for immunological analysis as well. Furthermore, the specimen analysis system 100 may include two or more analysis sections 105. The number of analysis sections 105 is not limited to one.

Figure 12:
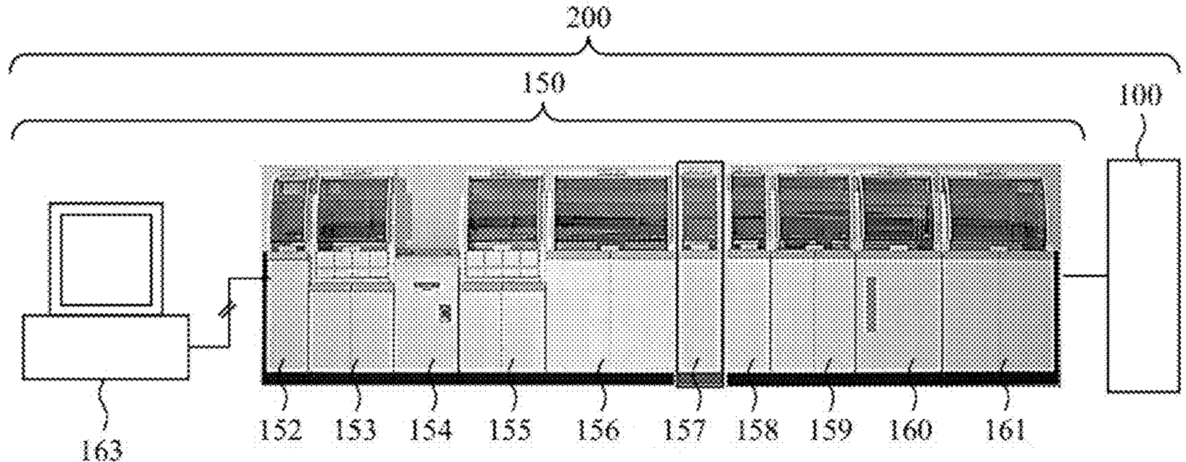
FIG. 12 is a diagram illustrating a configuration of a specimen pretreatment device.

An overall configuration of a specimen pretreatment device 150 will now be described with reference to FIG. 12. FIG. 12 is a diagram illustrating the overall configuration of the specimen pretreatment device 150. Described with reference to FIG. 12, the specimen pretreatment device 150 performs various pretreatments necessary for specimen analysis. The specimen pretreatment device 150 includes a capping unit 152, a specimen storage unit 153, an empty holder stacker 154, a specimen loading unit 155, a centrifugation unit 156, a liquid volume measurement unit 157, an uncapping unit 158, a child specimen container preparation unit 159, a dispensing unit 160, a transfer unit 161, and an operation section PC 163. The operation section PC 163 controls the operations of a plurality of the above-mentioned units.

The specimen analysis system 100 which performs qualitative and quantitative analysis of components of the specimen is connected to the specimen pretreatment device 150 as a destination for transferring the specimen pretreated by the specimen pretreatment device 150. The specimen loading unit 155 loads the specimen container 122 which contains the specimen into the specimen pretreatment device 150. The centrifugation unit 156 performs centrifugation on the loaded specimen container 122. The liquid volume measurement unit 157 measures the liquid volume of the specimen contained in the specimen container 122. The uncapping unit 158 opens the cap of the loaded specimen container 122. The child specimen container preparation unit 159 makes preparations necessary for dispensing the specimen contained in the loaded specimen container 122 into the dispensing unit 160 of the following stage. The dispensing unit 160 subdivides the centrifuged specimen for analysis to be made, for example, by the specimen analysis system, and attaches, for example, barcodes to the specimen containers 122 containing the subdivided specimens (the specimen containers 122 containing the subdivided specimens are hereinafter referred to as the child specimen containers 122). The transfer unit 161 sorts the child specimen containers 122 resulting from dispensing, and prepares them for transfer to the specimen analysis system 100. The capping unit 152 caps the specimen containers 122 and the child specimen containers 122. The specimen storage unit 153 stores the capped specimen containers 122.

The conveyance device according to any one of the first to fifth embodiments can be used as a mechanism for conveying a specimen holder and the specimen rack that hold the specimen containers 122 between the above-described units and between the specimen pretreatment device 150 and the specimen analysis system 100. It should be noted that the specimen pretreatment device 150 does not need to include all of the above-described component elements and can omit some units and component elements. Further, the specimen pretreatment device 150 may include units other than the units described above.

Furthermore, the specimen analysis system according to the present embodiment may be a system 200 including the specimen pretreatment device 150 and the specimen analysis system 100 as depicted in FIG. 12. In this case, not only within each system but also between the system 200 and the system 200 may be connected by the conveyance device 1 according to the first to fifth embodiments described above.

Moreover, the foregoing embodiments have been described on the assumption that the specimen rack 111 holding five specimen containers 122 containing specimens is conveyed as the conveyance target object. However, in addition to the specimen rack 111 holding five specimen containers 122, a specimen holder holding two specimen containers 122 can be conveyed as the conveyance target object.

The specimen analysis systems 100 and 200 and the specimen pretreatment device 150 include the conveyance device 1 according to the first to fifth embodiments. This makes it possible to reduce the dependence of the magnitude of the thrust force at the time of conveyance and stoppage of the specimen rack 111 and the specimen holder on the location of the specimen rack 111 and the sample holder. Further, it is possible to provide the conveyance device 1 in which the detected value and the change value of the current necessary for detecting the locations of the specimen rack 111 and the specimen holder are stable. That is, it is possible to implement the conveyance device 1 in which the specimen rack 111 and the specimen holder are highly controllable and the locations of the specimen rack 111 and the specimen holder are estimated with high accuracy.

It should be noted that the present invention is not limited to the foregoing embodiments and may be variously modified. The foregoing embodiments have been described in detail to facilitate the understanding of the present invention and do not need to include all the component elements described above.

Further, some component elements of an embodiment may be replaced by the component elements of another embodiment, and the component elements of an embodiment can be added to the component elements of another embodiment. Furthermore, some component elements of each embodiment may be subjected to addition of other component elements, deletion, or replacement by other component elements.

For example, the first to fifth embodiments have been described on the assumption that the specimen rack 111 and the specimen holder are handled as the conveyance target object to be conveyed by the conveyance device 1. However, the conveyance target object is not limited to, for example, racks and holders holding the specimen containers 122. A variety of objects that are required to be conveyed on a large scale can be handled as the conveyance target object.

Moreover, the first to fourth embodiments have been described on the assumption that the additional yoke 45 is separate from the yoke 40. However, the additional yoke 45 and the yoke 40 may integrally be molded.

Description of Reference Symbols

- 1: Conveyance device
- 2: Magnetic circuit section
- 10: Conveyance target object
- 11: Permanent magnet
- 12: Holder cover
- 15: Conveyance surface
- 20: Teeth
- 20*a*: Teeth on outer side
- 20*b*, 20*c*: Teeth on inner side
- 21: Auxiliary teeth
- 21*a*, 21*b*: Auxiliary teeth
- 30: Winding
- 40: Yoke
- 45, 46, 47: Additional yoke
- 50: Drive circuit
- 53: Calculation section
- 55: Current detection section
- 60: Inductance characteristics of teeth on inner side
- 61: Inductance characteristics of teeth on outer side
- 62: Inductance characteristics of teeth on outer side when additional yoke is installed
- 100: Specimen analysis system
- 101: Loading section
- 102: Conveyance line
- 103: Storage section
- 104: Buffer
- 105: Analysis section
- 106: Conveyor line
- 107: Specimen dispensing nozzle
- 108: Reaction disk
- 109: Reagent dispensing nozzle
- 110: Reagent disk
- 111: Specimen rack
- 112: Cleaning mechanism
- 113: Emergency rack loading port
- 114: Reagent tray
- 115: Reagent ID reader
- 116: Reagent loader
- 118: Display section
- 120: Control section
- 121: Spectrophotometer
- 122: Specimen container, child specimen container
- 150: Specimen pretreatment device
- 152: Capping unit
- 153: Specimen storage unit
- 154: Holder stacker
- 155: Specimen loading unit
- 156: Centrifugation unit
- 157: Liquid volume measurement unit
- 158: Uncapping unit
- 159: Child specimen container preparation unit
- 160: Dispensing unit
- 161: Transfer unit
- 163: Operation section PC
- 200: Specimen analysis system

The invention claimed is:

1. A conveyance device for conveying a conveyance target object having a magnetic material, the conveyance device comprising:
   - a plurality of teeth formed by a magnetic material;
   - a plurality of windings wound around each of the plurality of teeth;
   - a yoke in a shape of a lattice formed by a magnetic material that is magnetically connected to the plurality of teeth in order to support the plurality of teeth; and an additional yoke formed by a magnetic material that is magnetically connected to an outer end of the yoke, wherein auxiliary teeth formed by a magnetic material with no winding are magnetically connected to the additional yoke.

2. The conveyance device according to claim 1, wherein the additional yoke is coupled to an outer periphery of the yoke.

3. The conveyance device according to claim 1, wherein the additional yoke is molded integrally with the yoke.

4. The conveyance device according to claim 1, wherein the additional yoke magnetically connects the teeth on an outer side of a magnetic circuit section to other teeth.

5. The conveyance device according to claim 4, wherein the additional yoke magnetically connects the teeth on the outer side of the magnetic circuit section to the teeth on an inner side of the magnetic circuit section.

6. The conveyance device according to claim 4, wherein the additional yoke magnetically connects the teeth on the outer side of the magnetic circuit section to at least two other teeth.

7. The conveyance device according to claim 4, wherein the additional yoke magnetically connects at least two of the teeth on the outer side of the magnetic circuit section with each other.

8. The conveyance device according to claim 1, wherein a height of the auxiliary teeth is less than a height of the teeth wound with the windings.

9. The conveyance device according to claim 1, wherein a plurality of the auxiliary teeth is disposed along one side of the conveyance device substantially shaped like a quadrilateral and become thicker and/or longer from a center of the one side toward a corner.

10. The conveyance device according to claim 1, wherein a width of the additional yoke increases from a center of one side of the conveyance device substantially shaped like a quadrilateral toward a corner.

11. The conveyance device according to claim 1, wherein a location of the conveyance target object is detected on a basis of a current value of each winding.

12. A specimen analysis system comprising:

the conveyance device according to claim 1.

13. A specimen pretreatment device comprising:

the conveyance device according to claim 1.

14. A conveyance device for conveying a conveyance target object having a magnetic material, the conveyance device comprising:

a plurality of teeth formed by a magnetic material;

a plurality of windings wound around each of the plurality of teeth;

a yoke in a shape of a lattice formed by a magnetic material that is magnetically connected to the plurality of teeth in order to support the plurality of teeth; and an additional yoke formed by a magnetic material that is magnetically connected to an outer end of the yoke, wherein a width of the additional yoke increases from a center of one side of the conveyance device substantially shaped like a quadrilateral toward a corner.

* * * * *